No. 891,720. PATENTED JUNE 23, 1908.
W. C. O'BRIEN.
MOTOR CONTROLLING DEVICE.
APPLICATION FILED JAN. 19, 1907. RENEWED JAN. 28, 1908.

3 SHEETS—SHEET 1.

Witnesses
C. H. Walker.
Newton Willis.

Inventor,
Wm. C. O'Brien.

By Robert Watson
Attorney

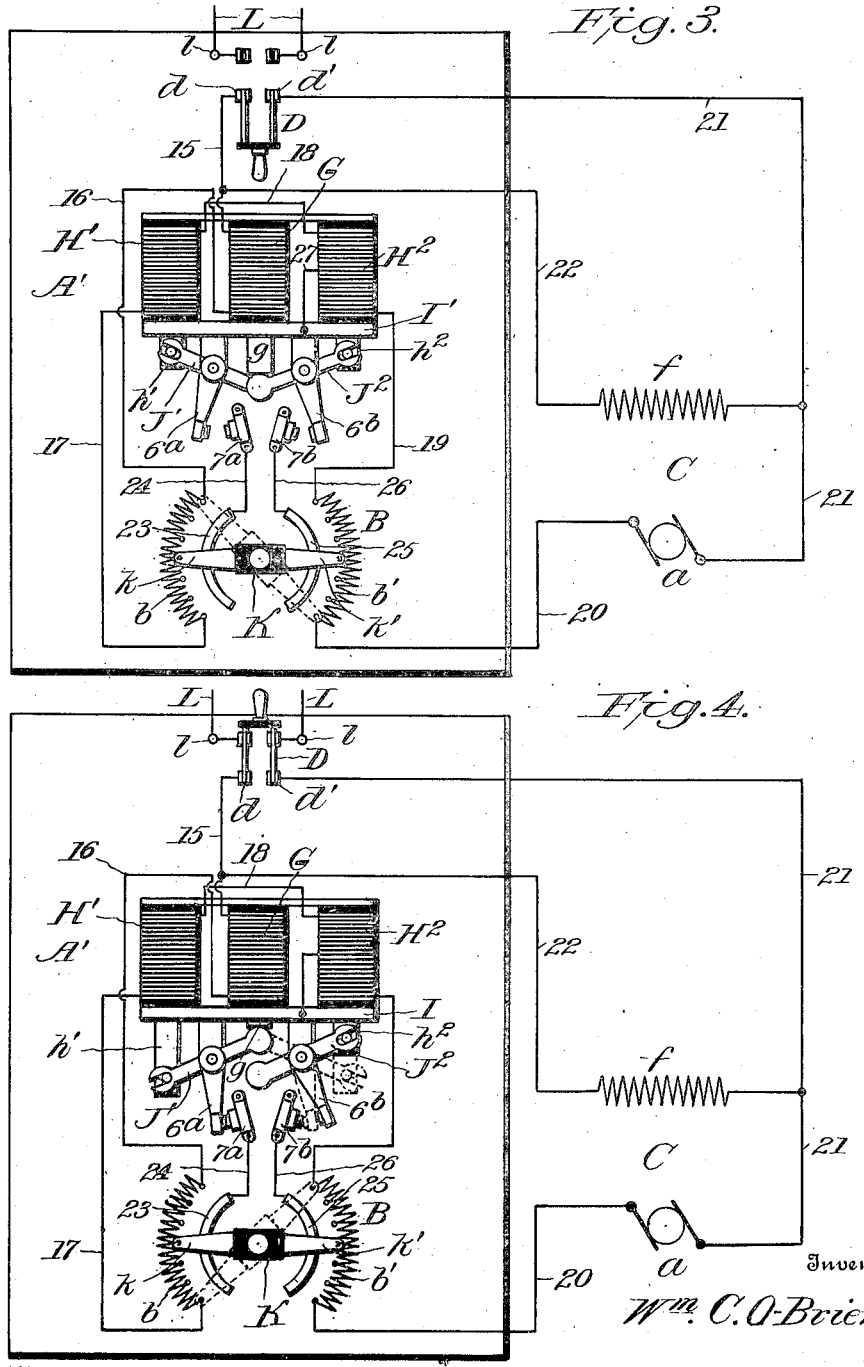

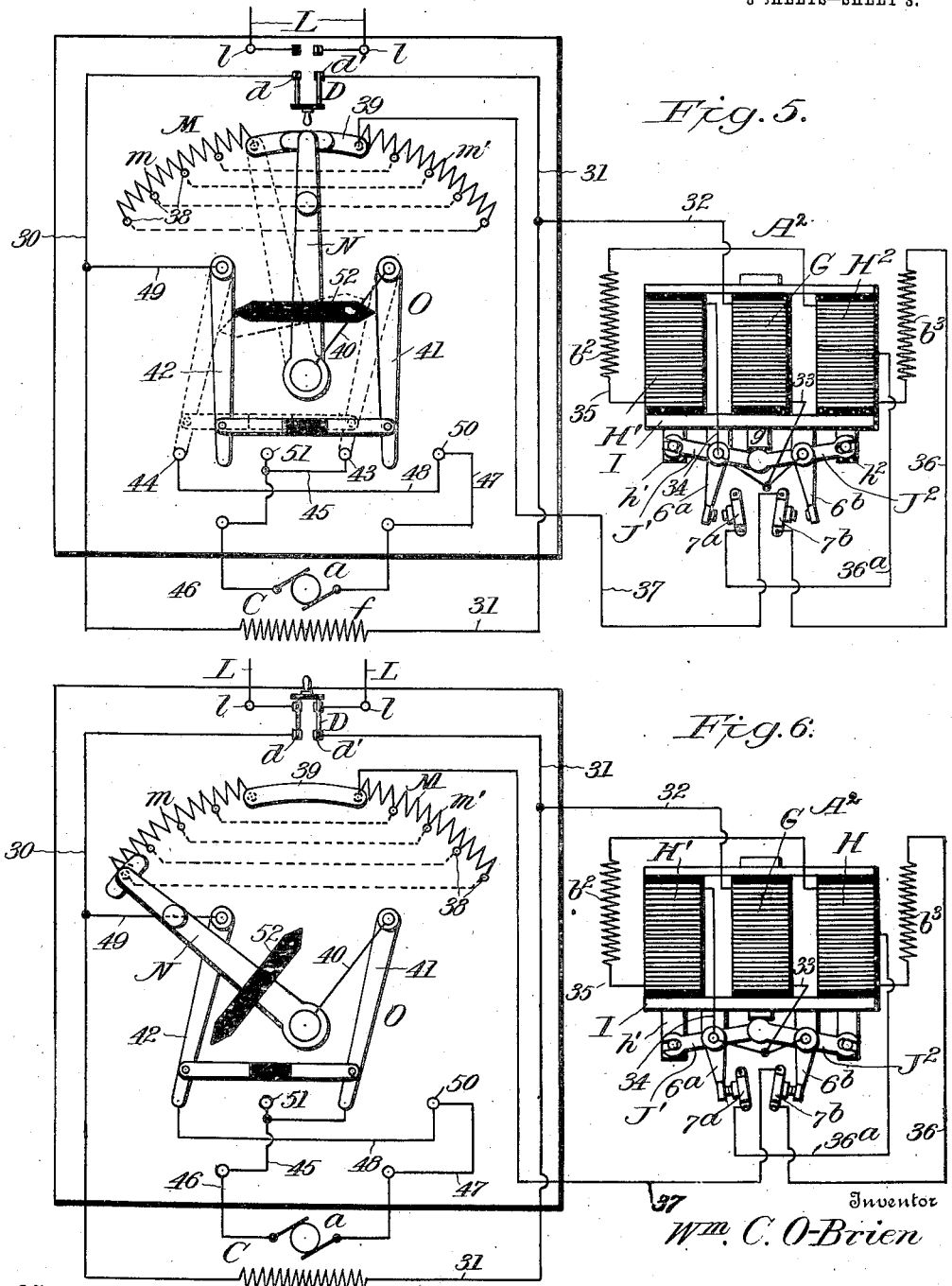

UNITED STATES PATENT OFFICE.

WILLIAM C. O'BRIEN, OF BALTIMORE, MARYLAND, ASSIGNOR TO MONITOR MANUFACTURING COMPANY OF BALTIMORE CITY, OF BALTIMORE, MARYLAND, A CORPORATION OF MARYLAND.

MOTOR-CONTROLLING DEVICE.

No. 891,720.      Specification of Letters Patent.      Patented June 23, 1908.

Application filed January 19, 1907, Serial No. 353,168. Renewed January 28, 1908. Serial No. 412,993.

*To all whom it may concern:*

Be it known that I, WILLIAM C. O'BRIEN, a citizen of the United States, residing at Baltimore, in the State of Maryland, have invented certain new and useful Improvements in Motor-Controlling Devices, of which the following is a specification.

This invention relates to improvements in means for operating electric motors which have to be frequently stopped and started and operated at different speeds.

The details and advantages of the improvements will be pointed out in the following specification, taken in connection with the accompanying drawing, in which—

Figure 1:
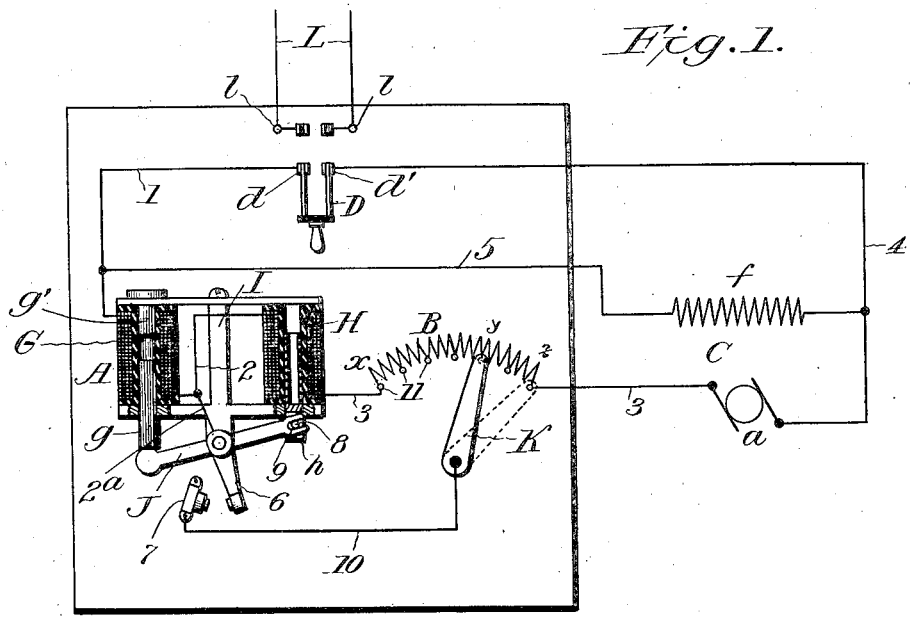
Figure 2:
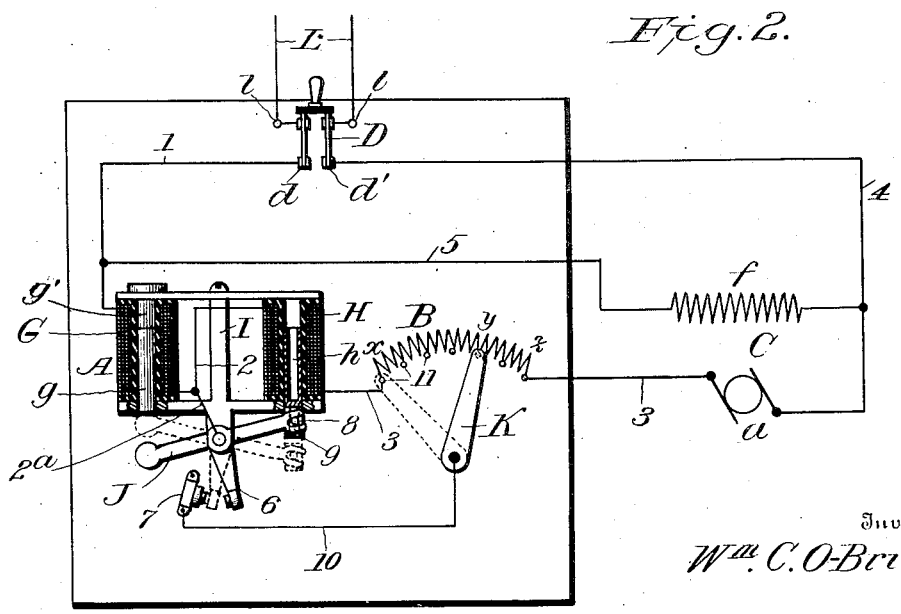

Figure 1 shows, partly in side elevation and partly in section, a simple form of current controlled starter for cutting out the starting resistance of the motor at one operation, and a hand regulator for regulating the amount of starting resistance thus cut out, the same resistance in this instance being used for both starting the motor and regulating its speed the switch for stopping and starting the motor being shown in open position and the movable parts of the motor being shown in their normal positions; Fig. 2 is a similar view, with the starting and stopping switch closed, the parts of the starter being shown in full lines in the positions which they occupy as long as the starting current in the armature circuit remains above a predetermined quantity, and in dotted lines in the positions which they assume as soon as the current falls below said predetermined quantity; Figs. 3 and 4 are side elevations of similarly operating devices arranged to cut out the starting resistance in two steps or operations, the hand regulator being arranged to regulate the amount of starting resistance cut out or remaining in the circuit after the starter operates; Figs. 5 and 6 illustrate starters operating in the same way, in connection with an auxiliary resistance and a hand regulator for the latter, and a reversing switch for reversing the direction of the current in the motor.

Referring to Figs. 1 and 2 of the drawing, A indicates an automatic starter of my design, the operation of which, in cutting out the starting resistance B, is controlled by the quantity of current flowing in the armature circuit of the motor C, after the closing of the hand switch D which connects the motor circuits to the terminals $l$ of the supply wires L. The armature circuit of the motor extends from the terminal $d$ of the switch through conductor 1 to the solenoid G, thence through conductor 2, through solenoid H, thence through conductor 3 and starting resistance B to the motor armature $a$, and thence by conductor 4 to the terminal $d'$ of the switch D. The circuit of the field $f$ extends through conductors 1, 5 and 4. The solenoid windings and the starting resistance, it will be seen, are connected in series with the armature. The solenoids are mounted in a suitable metal frame I, at the lower end of which is arranged a lever J, pivoted at or near its center to the frame, and carrying a switch arm 6, adapted to engage a stationary switch member or contact 7 when the lever is rocked from the position shown in full lines in the latter figure. The core $g$ of the solenoid G is solid and rests normally upon one end of the lever, and the core $h$ of the solenoid H is hollow so as to be lighter than the core $g$, and is connected to the opposite end of the lever by a pin 8, extending into a fork 9 in the lever. The core $g$ may move upwardly independently of the lever, but the lever always moves with the core $h$, on account of the pivotal connection between these two parts. The contact 7 is connected by a conductor 10 to a hand regulator arm K, adapted to engage any one of the contact points 11 connected with the resistance.

The operation is as follows—When the switch D is closed, the circuit is completed through the field of the motor, and also through the solenoids of the starter, the entire starting resistance and the motor armature in series, the shunt circuit through the conductor 10 being open. The heavier core $g$ moves instantly upward away from the lever J, as shown in Fig. 2, the moment the switch D is closed, and adheres to a short core $g'$ arranged in the upper part of the solenoid G and forming a holding magnet. The lighter core $h$ will be held in its upper position as long as the starting current remains above a predetermined quantity, which, ordinarily, is slightly above the maximum current which the motor armature is designed to carry. When, through the acceleration of the motor armature, the current flowing in the armature circuit falls below this predetermined quantity, the core $h$ drops, rocking the lever J until the switch member 6 engages the stationary member 7, when the armature current instead of flowing through the solenoid H and the entire starting resistance, as before, will pass from the wire 2 through connecting wire 2ᵃ to the switch arm 6, thence through the switch member 7 and wire 10 to the hand regulating arm K and through the section y—z of the resistance to the armature. The solenoid H and the section x—y of the resistance are thus shunted. In Fig. 1 the parts are shown in normal positions, and in Fig. 2 the parts are shown in full lines in the positions occupied immediately after the closing of the line switch, and in dotted lines in the positions assumed when the starting current falls below the predetermined quantity. According to the position of the hand regulator K, more or less of the resistance will be left in circuit with the armature, to regulate the speed after the starter has operated to cut out resistance. Thus, if the hand regulator K is set in position shown in dotted lines in Fig. 1, all of the resistance will be cut out the moment the switch 6—7 closes, and the motor will run at full speed; if the hand regulator is left in the position shown in full lines in said figure, the section y—z of resistance will remain in series with the armature and the motor will run at a lower speed; and if it is desired to run the motor at a very low speed the hand regulator may be set on the first contact point of the resistance as indicated in dotted lines in Fig. 2. In this latter position, it will be seen that when the current drops to the predetermined quantity aforesaid, the switch 6—7 will close, but none of the resistance will be cut out, and the motor will run at slow speed with all the resistance in circuit with the armature.

In operating printing presses, for some classes of work the press should operate faster than on others; but for any given job the press should always run at the same speed until the job is finished in order that the inked form may be pressed against the paper for the same length of time during each impression. It is also desirable to be able to stop and start the press whenever necessary, and when started to run at the same speed as before. With my improvements, the foreman sets the hand regulator K so as to give the desired speed, and all the operator has to do is to close the switch D to start the motor and to open the switch to stop the motor. If the motor starts quickly the automatic controller acts quickly, and conversely; but in any event, the automatic controller cannot operate to cut out resistance until the current falls below the predetermined safe quantity, and then it will cut out the entire resistance, a part of the resistance, or it will not cut out any of the resistance, depending upon the position in which the hand regulator is set.

In addition to its use in connection with printing presses, this combination of a hand switch, a hand regulator and a starter controlled by the quantity of current flowing in the armature circuit is found useful in connection with motors for driving various forms of shop tools. The hand regulator may be placed in a position inaccessible to the operator, where the operator of the tool or press is inexperienced and is likely to adjust the speed to suit himself instead of suiting the work to be performed. It frequently happens in printing offices that the operator will stop his press for some time and then, in order to make up for the lost time, will, without the knowledge of the foreman, and with the devices now in use, speed the press up and thus turn out two grades of work on the same job. If the hand regulator is under the control of the foreman only, this cannot be done, and, therefore, to provide for such contingencies the resistance and the hand regulator may be located at some place remote from the switch D which the operator uses to stop and start the motor. No matter in what position the hand regulator may be left, no injury can occur to the motor, as it is always protected by the full starting resistance until the current falls to a safe quantity, and then the desired amount of resistance for regulating purposes is left in circuit.

In Figs. 3 and 4 the arrangement is the same as in the previously described figures, except that I have shown the starting resistance in two sections and an automatic starter for cutting out said sections successively and a hand regulator for regulating the amount of resistance cut out of both sections. In these figures G is a solenoid corresponding in function to the similarly lettered solenoid in Figs. 1 and 2, and $H'$, $H^2$, are two solenoids corresponding in function to the solenoid H in Figs. 1 and 2 and arranged to act successively to cut out sections of the resistance. As shown in Fig. 3, the core $g$ of the solenoid G normally rests upon the free ends of the two levers $J'$ and $J^2$, and it is heavy enough to over-balance the weight of the cores $h'$ and $h^2$ and hold said latter cores within the solenoids $H'$ and $H^2$, respectively. The solenoid windings are connected in series through the starting resistance and armature, and the solenoid $H'$ is weaker than the solenoid $H^2$ so that when the current falls a certain amount the core $h'$ will first drop, cutting out a portion of the starting resistance, its own coils and some of the coils of the solenoid $H^2$. After the temporary rise in current which follows the cutting out of the first section of the starting resistance, when the current again falls to about the quantity flowing when the core $h'$ dropped, or somewhat less, the core $h^2$ will drop, cutting out the remaining resistance. The hand regulator determines the amount of resistance cut out and remaining in circuit, and, therefore, the speed of the motor.

In Fig. 3, wherein the parts are in their normal positions, with the starting switch D open, the armature circuit extends from the side $d$ of the switch through conductor 15 to the coils of the solenoid G, thence by conductor 16 to one section $b$ of the resistance B, thence through said section and conductor 17 to the coils of the solenoids H'; thence by conductor 18 to the coils of the solenoid $H^2$, thence by conductor 19 to the resistance section $b'$ and through said section to the conductor 20, thence through said conductor 20 to the armature $a$ and thence to the switch terminal $d'$ by way of the conductor 21. This is the course followed by the armature current as long as the quantity of current in the armature circuit at starting is sufficient to support the core of the solenoid H'. The circuit of the field $f$ extends through conductors 15, 22 and 21 to the terminals of the switch D. The hand controller K has two metal blades $k$, $k'$, insulated from one another, and adapted to engage the contact points of the resistance sections $b$ and $b'$, respectively. The blade $k$ also engages a metal segment 23 which is connected by a conductor 24 to a stationary contact member $7^a$, and the blade $k'$ engages a similar metal segment 25 which is connected to the stationary contact member $7^b$ by a conductor 26. The levers J' and $J^2$ carry the switch arms $6^a$ and $6^b$ which are adapted to engage the stationary switch members or contacts $7^a$ and $7^b$, respectively, when the levers are allowed to rock by reason of the fall of current in the armature circuit. A conductor 27, leading from an intermediate portion of the windings of the solenoid $H^2$ is grounded on the frame I' of the starter, in order to conduct the current to the switch arms $6^a$ and $6^b$.

When the switch D is closed, the current flows through the field, and also in the course indicated above through the coils of the several solenoids, the entire starting resistance and the motor armature. The core $g$ moves upward instantly after the closure of the switch D, as shown in Fig. 4, but the cores $h'$ and $h^2$ remain in their upper positions until the current falls to a predetermined amount. When the current falls below this amount, the core $h'$ of the weaker solenoid H' drops, causing the switch arm $6^a$ to close against the stationary member $7^a$. The armature current then flows from the conductor 16 through part of the starting resistance to the blade $k$ of the regulator K, thence through the metal segment 23, conductor 24, stationary switch member $7^a$, switch arm $6^a$ and the frame of the starter to the conductor 27, thence through part of the coils of the solenoid $H^2$ to the conductor 19, thence through all of the resistance $b'$ and thence through conductor 20 to the armature. That part of the resistance section $b$ between the blade $k$ and the conductor 17 is thus cut out, together with the coils of the solenoid H' and part of the coils of the solenoid $H^2$, weakening the latter solenoid so that after the temporary rise in the quantity of current which follows the cutting out of part of the resistance, the core of the latter solenoid will drop when the current again falls to or slightly below what it was before.

If the regulator blade $k$ is in the position shown in dotted lines in Fig. 3 at the time when the switch $6^a$—$7^a$ closes, all of the resistance section $b$ will be cut out; but if said blade is in the position indicated in dotted lines in Fig. 4 at that time none of the resistance will be cut out. When the current, after the temporary rise falls so as to cause the solenoid $H^2$ to release its core $h^2$, the switch $6^b$—$7^b$ closes and the armature current then flows from the conductor 16 through that portion of the resistance section $b$ which is between said conductor and the regulator blade $k$, thence through said blade to the segment 23, thence through conductor 24, switch members $7^a$ and $6^a$, then through the frame of the starter, switch members $6^b$—$7^b$, conductor 26 and segment 25 to the blade $k'$, thence through the blade $k'$ of the regulator and through that portion of the resistance section $b'$ between said blade and the conductor 20 and thence through conductor 20 to the armature. Both of the solenoids H' and $H^2$ will then be short circuited, together with portions of the starting resistance between the blade $k$ and the conductor 17 and between the blade $k'$ and the conductor 19. If the regulator blades are in the position shown in dotted lines in Fig. 3 all of the resistance in both sections will be cut out after the current has fallen to the predetermined quantity and the starter has operated, and if the regulator blades are in the position shown in dotted lines in Fig. 4 all of the resistance will remain in circuit after the starter has operated. The speed at which the motor then runs will depend upon the quantity of resistance left in circuit. If the regulator is set in the position shown in dotted lines in Fig. 4, so that the whole resistance section $b$ is left in circuit when the switch members $6^a$—$7^a$ close, the core of the solenoid $H^2$ will drop immediately thereafter, but this can do no harm as all of the starting resistance remains in circuit. In any intermediate position of the regulator blades the starter will operate quicker than in the position indicated in dotted lines in Fig. 3, wherein all of the resistance is cut out after the starter operates.

In all of the foregoing figures the starting resistance and the regulating resistance are one and the same thing. In Figs. 5 and 6 I have illustrated an appartaus particularly adapted for printing press control, but also suitable for other uses where the motor has to be stopped and started frequently and operated at different speeds and reversed. In these figures the usual starting resistance is employed, and in addition thereto a regulating resistance is arranged so as to be included in series with the armature.

Referring to Fig. 5 of the drawing, $A^2$ indicates a starter controlled by the quantity of current flowing in the armature circuit, in the same manner as the starter shown in Figs. 3 and 4 is controlled, there being no provision, however, for retaining part of the starting resistance in circuit when the switches $6^a$ and $6^b$ close. An auxiliary resistance M and a hand regulating arm N are used for the purpose of regulating the speed. This hand regulator is also arranged to move a reversing switch O for reversing the direction of current through the armature of the motor when a change in the direction of the armature is required. The circuit of the field $f$ of the motor extends to the terminals of the switch D through the conductors 30 and 31. The armature circuit extends from the conductor 31 through conductor 32 to the coils of the solenoid G and thence by conductor 33 to the frame I of the starter. When the switch arms $6^a$ and $6^b$ are open, as in Fig. 5, the armature circuit extends from the frame of the starter through conductor 34 to the coils of the solenoids H' and thence by conductor 35 through the section $b^2$ of the starting resistance to the coils of the solenoid $H^2$; thence through resistance section $b^3$ and conductor 36 to the stationary contact member $7^b$, and from thence through conductor 37 to the center of the auxiliary resistance M, which is divided into two sections $m$ and $m'$. The regulating lever N is arranged to engage the contacts 38 of either section of said auxiliary resistance, according to the direction in which it is moved from its central position, and in the central position it engages the bridge piece 39 connecting the two sections. From the resistance M the armature circuit extends through the lever N and thence by conductor 40 to one arm or blade 41 of the reversing switch O. In the central position of lever N the armature circuit is interrupted at the reversing switch; but if said lever is moved to the left of the center, as indicated in dotted lines in Fig. 5 and in full lines in Fig. 6, the arms 41 and 42 of the reversing switch will engage the armature terminals 43 and 44 respectively. The armature circuit will then be completed from the switch arm 41 to contact 43, thence through conductors 45 and 46 to the armature, thence through conductors 47 and 48 to the terminal 44, then through reversing switch arm 42 and through conductors 49 and 30 to the terminal $d$ of the switch D. When the hand regulator arm N is set at the right of the center the reversing switch blades 41 and 42 will engage armature terminals 50 and 51, respectively, and the circuit through the armature will be in the reverse direction as will be obvious. The regulator arm has a cross piece 52 arranged between the reversing switch blades so as to engage said blades near their pivoted points and give the required movement to the reversing switch by the time the regulating arm is moved onto the first contact point of the auxiliary or regulating resistance, as shown in dotted lines in Fig. 5.

A conductor $36^a$ extends from an intermediate portion of the coils of the stronger solenoid $H^2$ to the stationary contact or switch member $7^a$. When the core of the weaker solenoid H' drops, closing switch $6^a$, $7^a$, the current will flow from the frame of the starter through said switch, conductor $36^a$, part of the coils of solenoid $H^2$, resistance section $b^3$ and conductors 36 and 37 to the auxiliary resistance M and thence through the regulator arm and reversing switch to the motor armature. The resistance section $b^2$, the coils of the solenoid H' and part of the coils of the solenoid $H^2$ will thus be cut out. When the core of the solenoid $H^2$ drops, closing the switch $6^b$—$7^b$, the current flows from the frame of the starter through said switch and conductor 37 to the auxiliary resistance, regulator arm and reversing switch and thence to the motor armature, thus cutting out the remaining coils of solenoid $H^2$ and the resistance section $b^3$.

In operation the regulator arm is moved to set the reversing switch and introduce whatever amount of regulating resistance is required to give the desired speed. If it is desired to start or run the motor with full power and speed, the regulating lever may be set at one end of the bridge piece 39, as indicated in dotted lines in Fig. 5, at which point the regulating resistance is entirely out of circuit. The starting resistance $b^2$, $b^3$ is, however, entirely in circuit with the armature at the time when the switch D closes, and this starting resistance will be cut out as soon as the armature current falls to a predetermined safe quantity, the starter operating just as it would if no auxiliary resistance were provided. If, however, it is desired to run the press at a slow speed or to "tease" it in threading in a web of paper, the regulating arm N may be set so as to include any part or all of the auxiliary resistance. Thus, in Fig. 6, all of the auxiliary or regulating resistance is included in the armature circuit. In this position of the regulating lever, at the moment the switch D is closed all of the starting resistance and all of the regulating resistance are in series with the motor armature. If the amount of regulating resistance introduced is large, the flow of current may be so reduced at the start that the solenoids H' and $H^2$ will release their cores almost at once, and thus cut out all of the starting resistance, but in this event the regulating resistance in circuit is sufficient to prevent injury to the motor; or if less regulating resistance is introduced the weaker solenoid H' may release its core at once, cutting out one section of the starting resistance, the other solenoid H² retaining its core for a short interval until the current falls to the proper point when the core of the latter solenoid will drop, cutting out the remainder of the starting resistance. This is a great advantage, as it may be desired to start and stop the motor a number of times in the course of a minute or two, and the starter will operate just as quickly as it is possible to operate with safety, operating at once if a sufficient amount of regulating resistance is in circuit, and operated more slowly when less of the regulating resistance is in circuit. The motor is always protected by a sufficient resistance and the operator can never short circuit the motor, as might happen if a hand regulator alone were used and the lever of the regulator happened to be left in the wrong position. With this apparatus the motor cannot be injured no matter in what position the regulator arm may be left. With my improvements the resistance in circuit is eliminated the instant it becomes useless. In one view of the case, the operation of the starter is controlled by the quantity of resistance in the armature circuit, and whenever the starting resistance plus the regulator resistance is greater than necessary, the whole or part of the starting resistance is at once cut out. When the starting resistance plus the regulating resistance in circuit is sufficient to choke down the starting current below the predetermined maximum amount which it is desirable to admit to the motor armature, it will be seen that the operation of one or both of the cores of the solenoids H' and H² will not in any way depend upon the speeding up of the motor, or upon any operation requiring time. This is one of the chief advantages of my invention, others being the absolute safety and the impossibility of the operator making a mistake. The hand regulator, after being set for a given speed of the press need not be disturbed in subsequent starting and stopping operations, and, therefore, no matter how long or how often the press is stopped during the course of printing one job, when the switch D is closed the press will run at the same speed as before and the character of the printed work will remain uniform instead of being of different shades as occurs where part of the job is printed at one speed and other parts at different speeds.

It will be understood, of course, that in all cases the solenoid with the heavy core is arranged to lift and retain its core with the minimum current which may flow through the armature circuit.

I have shown, for the purpose of illustration, starters in which the starting resistance is either in one or two steps, suitable for motors ranging in size from one to about four horse power, but it will be understood that where larger motors are employed a starter operating on the same principle will be used with a sufficient number of resistance steps and solenoids to suit the larger motor.

What I claim is

1. In an electric motor controlling apparatus, a switch for starting and stopping the motor, a resistance for the armature circuit, an automatic controller having windings in series with the armature, said controller being adapted to operate to cut resistance out of said circuit whenever the armature current, at starting, is below a predetermined quantity, and to prevent cutting out resistance while the current is above said quantity, and a regulating device adapted to be set at will, for retaining more or less resistance in said circuit after said device has operated to cut out resistance.

2. In an electric motor controlling apparatus, a switch for starting and stopping the motor, a resistance for the armature circuit, an automatic controller having windings in series with the armature, said controller being adapted to operate to cut resistance out of said circuit whenever the armature current, at starting, is below a predetermined quantity, and to prevent cutting out resistance while the current is above said quantity, and to reinsert resistance in said circuit when said switch is opened, and a regulating device, adapted to be set at will, for retaining more or less resistance in said circuit after said device has operated to cut out resistance.

3. The combination with a motor, and a switch for starting and stopping the same, of a starting resistance arranged in series with the armature of the motor, so that the armature current will flow through the resistance when said switch is first closed to start the motor, a regulating device, adjustable at will, for engaging contacts connected to various portions of said resistance, said device being normally dead, or out of circuit, and an automatic controller actuated by the quantity of current flowing in the armature circuit, said controller being arranged to prevent said regulating device from being included in series with the armature while the starting current is above a predetermined quantity, and to include said device in series with the armature when the starting current falls below said predetermined quantity.

4. The combination with a motor and a switch for starting and stopping the same, of a starting resistance in series with the armature of the motor, a circuit for shunting said resistance, said shunt circuit including a normally open switch and a regulator, adjustable at will, for regulating the amount of said resistance to be shunted, and an automatic controlling device actuated by the quantity of current flowing in the armature circuit, said controlling device being adapted to hold said switch in the shunt circuit open as long as the starting current in the armature circuit remains above a predetermined quantity and to permit said switch to close when the current in the armature circuit falls below said predetermined quantity.

5. In an electric motor controlling apparatus a switch for starting and stopping the motor, a starting resistance and an automatic controlling device for said resistance, said device having windings normally connected in series with said resistance, whereby when said switch is first closed the armature current flows through all of said starting resistance and the windings of said controlling device, a shunt circuit for said starting resistance, said shunt circuit comprising a normally open switch adapted to be closed by said controlling device when the armature current falls below a predetermined quantity and means for connecting said shunt circuit to various points of the starting resistance.

In testimony whereof I affix my signature, in presence of two witnesses.

WILLIAM C. O'BRIEN.

Witnesses:
AUGUSTUS W. BRADFORD,
EDGAR F. HAHN.